United States Patent [19]

Ozaki et al.

[11] Patent Number: 4,707,904
[45] Date of Patent: Nov. 24, 1987

[54] METHOD OF MANUFACTURING A DIE FOR EXTRUDING HONEYCOMB BODY

[75] Inventors: Sei Ozaki, Aichi; Shoji Futamura, Kawasaki, both of Japan

[73] Assignees: NGK Insulators, Ltd.; Institute of Technology Precision Electrical Discharge Works, both of Japan

[21] Appl. No.: 943,796

[22] Filed: Dec. 19, 1986

Related U.S. Application Data

[62] Division of Ser. No. 664,003, Oct. 23, 1984, Pat. No. 4,653,996.

[30] Foreign Application Priority Data

Nov. 2, 1983 [JP] Japan .................................. 58-206560

[51] Int. Cl.⁴ ............................................... B23P 9/00
[52] U.S. Cl. ................................. 29/445; 29/163.5 R; 29/460; 29/526 R; 228/161; 427/423
[58] Field of Search .................. 29/445, 163.5 R, 460, 29/526 R; 427/423; 425/467, 466, 464; 228/161; 76/107 R

[56] References Cited

U.S. PATENT DOCUMENTS

| | | | |
|---|---|---|---|
| 3,005,491 | 10/1961 | Wells | 29/445 X |
| 3,975,814 | 8/1976 | Harrowing | 29/445 X |
| 3,977,660 | 8/1976 | Nakahira | 427/423 |
| 4,055,389 | 10/1977 | Hayward | 425/466 |
| 4,118,456 | 10/1978 | Blanding et al. | 425/464 |
| 4,167,386 | 9/1979 | Mallay | 425/467 |
| 4,184,832 | 1/1980 | Cuff | 425/464 |
| 4,235,583 | 11/1980 | Reed | 425/467 |
| 4,243,370 | 1/1981 | Higuchi et al. | 425/467 |
| 4,284,658 | 8/1981 | Davis et al. | 427/423 |
| 4,290,743 | 9/1981 | Suzuki | 425/467 |
| 4,321,025 | 3/1982 | Cunningham | 425/467 |
| 4,354,820 | 10/1982 | Yamamoto et al. | 425/467 |
| 4,382,534 | 5/1983 | Kwan | 228/161 |
| 4,486,934 | 12/1984 | Reed | 29/163.5 R |

FOREIGN PATENT DOCUMENTS

| | | |
|---|---|---|
| 2432125 | 1/1975 | Fed. Rep. of Germany . |
| 2211138 | 11/1980 | Fed. Rep. of Germany . |
| 1389229 | 4/1975 | United Kingdom . |
| 1459035 | 12/1976 | United Kingdom . |

Primary Examiner—Charlie T. Moon
Attorney, Agent, or Firm—Parkhurst & Oliff

[57] ABSTRACT

Disclosed herein is a die for extruding honeycomb structural body, which comprises a die base body made of an alloy steel and a plate of a wear resistant alloy which is joined to the front face side of the die base body. In the wear resistant alloy plate are formed forming slits having a sectional profile conforming to that of a honeycomb structural body to be shaped and having a given depth from the front face of the die toward the rear face thereof, and a plurality of openings are formed independently of each other in the die base body from the rear face of the die toward the front face thereof to communicate with the forming slits. The wear resistant alloy plate may be joined to the die base body through an alloy steel plate having the same as or thinner than the thickness of the wear resistant alloy plate. A method of manufacturing such a honeycomb structural body-extruding die is also disclosed.

2 Claims, 18 Drawing Figures

FIG_1a PRIOR ART
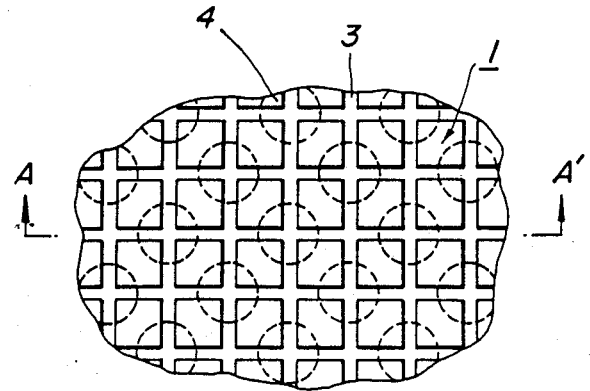
FIG_1b
PRIOR ART
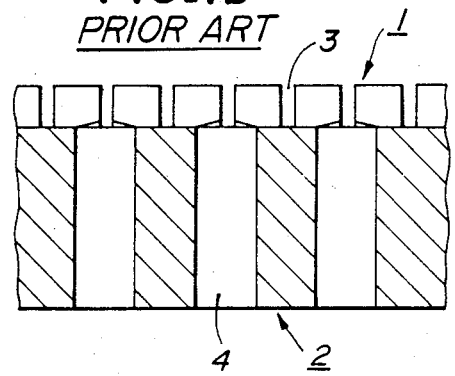
FIG_2
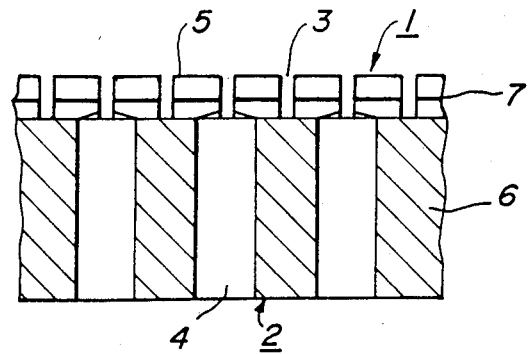

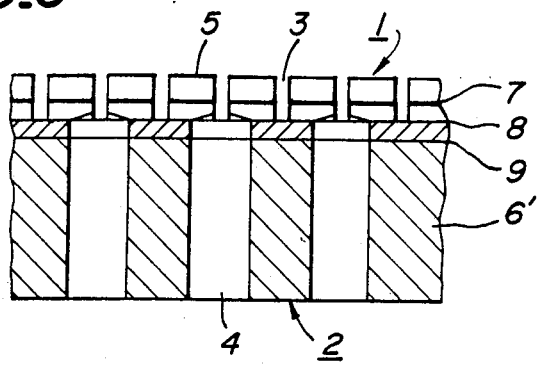
FIG. 3
FIG. 4.a
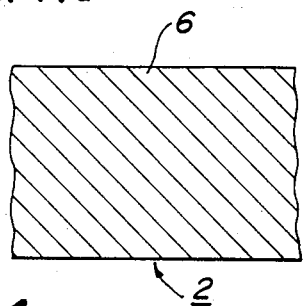
FIG. 4b
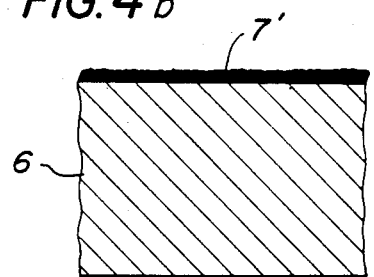
FIG. 4c
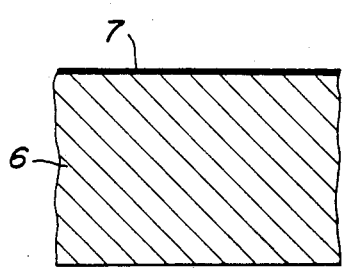
FIG. 4d
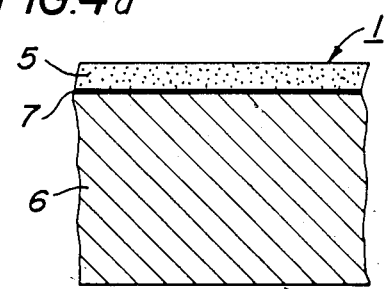
FIG. 4e
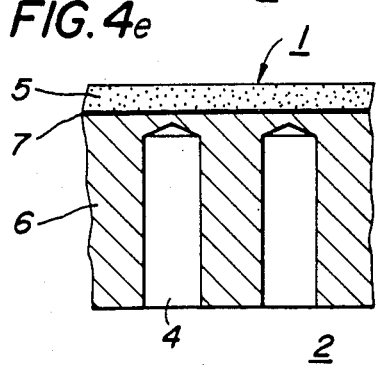
FIG. 4f
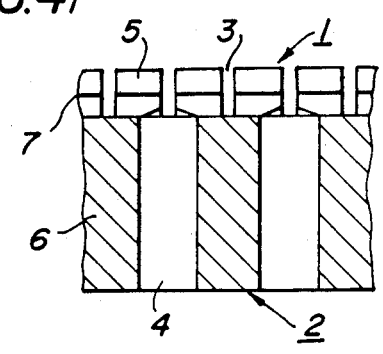

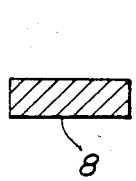 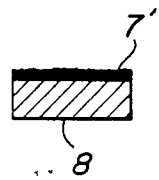 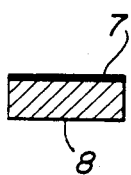 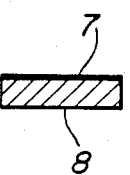 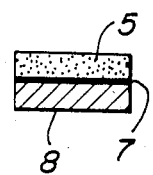
FIG. 5a'  FIG. 5b'  FIG. 5c'  FIG. 5d'  FIG. 5e'
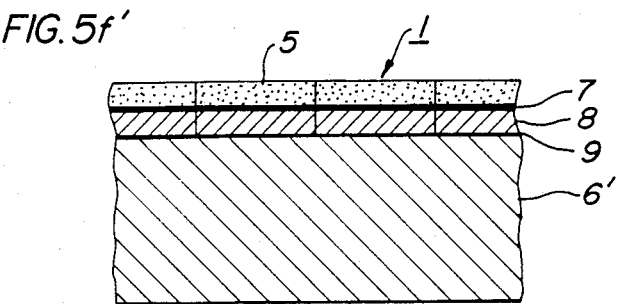
FIG. 5f'
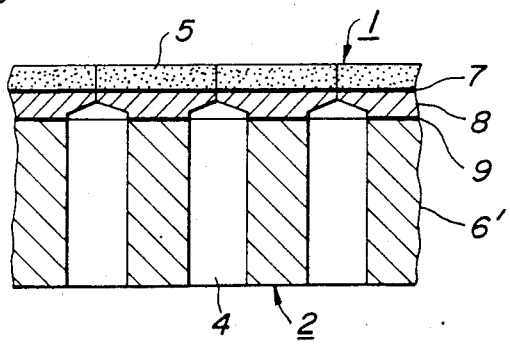
FIG. 5g'
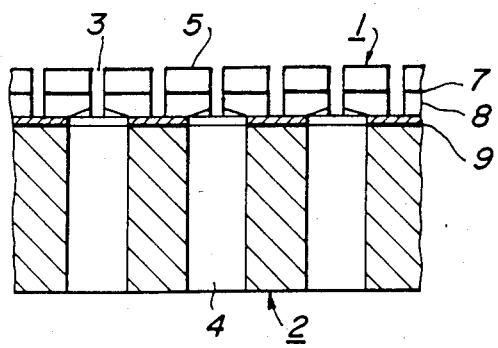
FIG. 5h'

METHOD OF MANUFACTURING A DIE FOR EXTRUDING HONEYCOMB BODY

This is a division of application Ser. No. 664,003, filed Oct. 23, 1984, now U.S. Pat. No. 4,653,996.

BACKGROUND OF THE INVENTION

(1) Field of the Invention

The present invention relates to a die for extruding a honeycomb structural body (hereinafter referred to as "honeycomb forming die") and a method of manufacturing the same, and more particularly, the invention relates to a honeycomb forming die used to extrude a plasticized material to form a honeycomb structural body in which a plate made of a wear resistant alloy (for instance, hard metal) is joined to the die front face portion to which forming slits are to be formed, and the forming slits are formed in the wear resistant alloy plate. The invention also relates to a method of manufacturing the same.

(2) Description of the Prior Art

Heretofore, there has been known a honeycomb forming die as shown in FIG. 1 (FIG. 1a is a plane view of the honeycomb forming die, and FIG. 1b is a sectional side view of the forming die shown in FIG. 1a as viewed from an arrow A-A'). More particularly, the honeycomb forming die shown in FIG. 1 is a so-called integral structure in which honeycomb forming slits 3 (hereinafter referred to as forming slits) having a specified depth are formed from the die front face 1 toward the die rear face 2 in such a sectional profile as to conform to the sectional profile of a honeycomb structural body to be shaped (a rectangular section honeycomb in the forming die shown in FIG. 1), and a plurality of openings 4 are independently formed from the die rear face 2 toward the die front face 1 to communicate with the above forming slits 3.

The honeycomb forming die shown in FIG. 1 is generally produced as follows:

That is, a block body is prepared from a metallic material by means of a general purpose machine tool such as lathe or the like, and numerous independent openings 4 are bored from one of the faces (die rear face 2) of the block body toward the other face (die front face 1) of the block body by means of a drilling machine. Thereafter, the honeycomb forming slits 3 are worked from the die front face 1 toward the die rear face 2 of the block body, for instance, by electrical discharge machining or the like to communicate with the openings 4.

When the honeycomb structural body is shaped by using the honeycomb forming die thus produced, a raw material of the honeycomb structural body to be shaped, such as a plasticized material of ceramic, is press fed into all the openings 4 and the plasticized material thus press fed flows into the forming slits while being squeezed, whereby the ceramic honeycomb structural body is continuously extruded from the forming slits 3.

However, when the honeycomb structural body is extruded by using such a conventional honeycomb forming die, the forming slits 3 are worn by the plasticized material passing through the forming slits 3, so that the width of the slits becomes larger. Consequently, in order to assure the dimensional precision of the honeycomb structural bodies, there is a problem that exchange of expensive dies must be made at a number of times. Particularly, when the honeycomb structural bodies are shaped by using a raw material of alumina or silicon carbide, a raw material of mullite having a coarse particle size or the like, the wear of the forming slits 3 is conspicuous, so that the durable life of the die becomes remarkably shorter.

Further, according to the conventional honeycomb forming die, the dimensional variations in the forming slits causes the difference in the extruding rate of the material to be extruded over the forming slits, so that there are problems that cracks are formed in the honeycomb structural body extruded thereby in a firing process, or the material is not extruded into a honeycomb shape.

SUMMARY OF THE INVENTION

It is an object of the present invention to provide a die for extruding a honeycomb structural body (hereinafter referred to as a honeycomb forming die) which eliminates the above-mentioned problems.

More specifically, the object of the present invention is to provide a honeycomb forming die in which the wear resistance of forming slits is increased to prolong the durable life of the forming die.

It is another object of the present invention to provide a method of manufacturing such a honeycomb forming die.

It is still another object of the present invention to provide a honeycomb forming die which prevents an unreasonable thermal stress concentration in the forming die while enhancing the wear resistance thereof.

It is a further object of the present invention to provide a method of manufacturing such a honeycomb forming die in which the thermal stress concentration is prevented.

According to a first aspect of the invention, there is a provision of a honeycomb forming die comprising a die base body made of an alloy steel and a plate of a wear resistant alloy which is joined to the front face side of the die base body, wherein the wear resistant alloy plate includes forming slits having a sectional profile conforming to that of a honeycomb structural body to be shaped and having a given depth from the front face of the die toward the rear face thereof, and a plurality of openings are formed independently of one another in the die base body from the rear face of the die toward the front face thereof to communicate with the forming slits.

According to a second aspect of the invention, there is a provision of a method of manufacturing a honeycomb forming die provided with forming slits having a sectional profile conforming to that of a honeycomb structural body to be shaped and a given depth from the front face of the die toward the rear face thereof and a plurality of openings formed from the rear face of the die toward the front face thereof to communicate with the forming slits, which method comprises the steps of working a plate made of a wear resistant alloy and constituting the die front face and a die base body made of an alloy steel and constituting the die rear face, into given profiles; flame-spraying the wear resistant alloy onto one of the worked faces of the die base body to form a flame-sprayed layer of the wear resistant alloy; joining the wear resistant alloy plate to the die base body through the flame-sprayed layer of the wear resistant alloy; working the forming slits in the wear resistant alloy plate; and boring the openings in the die base body.

According to a third aspect of the present invention, there is a provision of a honeycomb forming die in which a wear resistant alloy plate is joined to a flame-sprayed layer of the wear resistant alloy which is formed on one face of a plate of alloy steel having a thickness which is the same as or less than the thickness of the wear resistant alloy plate, a die base body is joined to the other face of the alloy steel, a plurality of independent holes are formed from the die base body toward the alloy steel plate, and the forming slits are formed from the wear resistant alloy plate toward the alloy steel plate to communicate with the forming slits, whereby the warping or peeling-off of the wear resistant alloy plate is prevented to prolong the durable life of the honeycomb forming die.

According to a fourth aspect of the present invention, there is a provision of a method of manufacturing a honeycomb forming die provided with forming slits having a sectional profile conforming to that of honeycomb structural body to be shaped and a given depth from the front face of the die toward the rear face thereof and a plurality of openings formed from the rear face of the die toward the front face thereof to communicate with the forming slits, which method comprises steps of working a plate made of a wear resistant alloy plate constituting the front face of the die, a die base body made of an alloy steel and constituting the rear face of the die, and an alloy steel plate interposed between the wear resistant alloy plate and the die base body into given profiles; flame-spraying a metal having substantially the same properties as those of the wear resistant alloy plate to form a flame-sprayed layer of the wear resistant alloy onto; grinding the plane of the wear resistant alloy flame-sprayed layer to a given thickness and joining the wear resistant alloy plate on the wear resistant alloy flame-sprayed layer; joining ther alloy steel plate to which the wear resistant alloy plate is joined, to the die base body; working the forming slits from the wear resistant alloy plate toward the alloy steel plate; and boring the openings from the die base body toward the alloy steel plate.

These and other objects, features, and advantages of the present invention will be well appreciated upon reading of the following description of the invention when taken in conjunction with the attached drawings with understanding that some modifications, variations and changes thereof could be easily made by the skilled in the art, to which the invention pertains, without departing from the spirit of the invention and scope of claims appended hereto.

BRIEF DESCRIPTION OF THE DRAWINGS

FIG. 1a is a plane view of a conventional honeycomb forming die;

FIG. 1b is a sectional side view of the honeycomb forming die in FIG. 1a as viewed from an arrow A-A';

FIG. 2 is a sectional side view illustrating the construction of an embodiment of a honeycomb forming die according to the present invention;

FIG. 3 is a sectional side view of another embodiment of the honeycomb forming die according to the present invention;

FIG. 4 is a schematic view illustrating a method of manufacturing the honeycomb forming die shown in FIG. 2; and FIG. 5 is a schematic view illustrating a method of manufacturing the honeycomb forming die shown in FIG. 3.

DESCRIPTION OF THE PREFERRED EMBODIMENTS

The present invention will be explained in more detail with reference to the preferred embodiments thereof with reference to the attached drawings, which are merely illustrative of the invention, and should not be interpreted limiting the scope of the invention.

The same and similar reference numerals represent the same or similar parts throughout the drawings.

In the drawings, a reference numeral 5 is a hard metal plate, reference numerals 6 and 6' die base body, a reference numeral 7 a first joining portion which is formed by flame-spraying a powder of a hard metal such as tungsten-carbon series, a reference numeral 7' a flame-sprayed layer, a reference numeral 8 a plate of an alloy steel, a reference numeral 9 a second joining portion at which the alloy steel plate 8 is joined to the die base body 6' by means of, for instance, brazing or the like.

Before entering the detailed explanation of the honeycomb forming die and a manufacturing method thereof according to the present invention, the difference between the conventional embodiment shown in FIG. 1 and the present invention will be briefly explained. That is, a plane view of each embodiment according to the present invention which will now be explained is the same as that of FIG. 1a provided that the square portion divided by the forming slits 3 of FIG. 1a is the hard metal plate 5.

The embodiment shown in FIG. 2 is constituted by joining the hard metal plate 5 and the die base body 6 made of the alloy steel together at the first joining portion 7 (the joining way will be described later with reference to FIG. 4). The die base body 6 used in this embodiment is preferably made of an alloy steel such as invar, which has substantailly the same thermal expansion coefficient as that of the hard metal plate 5. The forming slits 3 are formed from the hard metal plate 5 toward the die base plate 6, that is, the die front face 1 toward the die rear face 2, and a plurality of independent openings 4 which communicate with the forming slits 3 are bored from the die base body 6 toward the hard metal plate 5, that is, from the die rear face 2 toward the die front face 1 (a method of manufacturing the embodiment shown in FIG. 2 will be described later).

An embodiment according to the present invention shown in FIG. 3, is provided with the hard metal plate 5 the alloy steel plate 8, the die base body 6; and the hard metal plate 5 and the alloy steel plate 8 are joined via the first joining portion 7 in the same manner as in the embodiment shown in FIG. 2. On the other hand, the alloy steel plate 8 and the die base body 6' are joined together via the second joining portion 9 (the joining method will be described later in connection with FIG. 5). Forming slits 3 are formed from the hard metal plate 5, namely the front face 1 of the die toward the alloy steel plate 8, and the plurality of the independent openings which communicate with the forming slits 3 are formed from the die base body 6', that is, the rear face 2 of the die toward the alloy steel plate 8 (a method of manufacturing the embodiment shown in FIG. 3 will be described later in connection with FIG. 5.)

Since the forming slits 3 are formed in the hard metal plate 5 in the above-described embodiments shown in FIGS. 2 and 3, the wear resistance of the forming slits 3 in the extrusion molding is increased. When the hard metal plate 5 is directly joined to the die base body 6, as in the embodiment shown in FIG. 2, the joining is effected at a high temperature according to the liquid phase diffusion welding method. Accordingly, if there is any difference in thermal expansion between the hard metal and the alloy steel constituting the die base body 6, there is a likelihood that a bimetal phenomenon brings about warpage of the hard metal plate 5 of production of voids at the joining portion, so that the hard metal plate 5 is peeled off from the joining portion after the formation of the forming slits 3. In the embodiment illustrated in FIG. 3, the hard metal plate 5 is prevented from being warped or peeled off by joining the hard metal plate 5 to the die base body 6' via the alloy steel plate 8 with the use of the ordinary alloy steel.

Next, the method of producing the embodiment shown in FIG. 2 will be explained with reference to FIG. 4.

(a) As shown in FIG. 4a, an alloy steel such as invar is first processed by means of a general purpose machine tool such as a lathe to shape a die base body 6.

(b) Next, as shown in FIG. 4b, a powder of the hard metal (which is the same material as that of the hard metal plate mentioned later) is flame-sprayed onto the die base body at one face thereof to form the flame-sprayed layer 7' at a given thickness (for instance, 0.5–3.0 mm).

(c) Further, as shown in FIG. 4c, the surface of the flame-sprayed layer is ground to form the first joining portion 7 uniformly having a given thickness (for instance 0.3 to 1.0 mm).

(d) Then, as shown in FIG. 4d, a copper sheet (not shown) is interposed between the hard metal plate 5 shaped at a specified thickness (for instance, about 5 mm) and in a specified profile and the above first joining portion 7, and the liquid phase diffusion welding is carried out at a temperature of about 1,000° C. to perform the joining between the above hard metal plate 5 and the die base body 6.

(e) Thereafter, as shwon in FIG. 4e, a plurality of the openings 4 are bored in die base body 6 from the rear face 2 of the die by means of, for instance, a drilling machine. This boring may be performed after the above step (c).

(f) As shown in FIG. 4f, the forming slits 3 are formed from the surface of the above hard metal plate 5, that is, the front face 1 of the die by means of the electrical discharge machining or metal machining to communicate with the above openings 4. The forming slits are preferably formed extending over the joining portion 7 to reduce the pressure applied to the joining portion.

The die according to the embodiment shown in FIG. 2 for forming honeycomb structural bodies may be produced by the above-mentioned steps (a)–(f). In the embodiment illustrated in FIG. 2, although explanation has been made on the case where the hard metal plate 5 is joined to the die base body 5 through the first joining portion 7 (the above step (d)), when invar is used as the die base body 6, the hard metal 5 may be directly joined to the die base body 6 through the above-mentioned liquid phase diffusion welding.

Next, the method of producing the embodiment shown in FIG. 3 will be described in connection with FIG. 5.

(a') As shown in FIG. 5a', a plurality of the plates 8 of an alloy steel such as carbon steel are worked to have a given thickness (for instance, about 10 mm) and a given size (intergral times as large as the pitch dimension of the slit width of the forming slits 3 mentioned later).

The size of the alloy steel plate 8 is preferably designed to be smaller than about 50 mm×50 mm so that the adverse influence due to the difference in the thermal expansion between the hard metal and the alloy steel may be avoided.

(b') Next, the flame-sprayed layer 7' is formed in the same manner as in the above step (b) (shown in FIG. 5b').

(c') Then, surface-grinding is performed in the same manner as in the above step (c) to form a first joining portion 7 (shown in FIG. 5c').

(d') Next, as shown in FIG. 5d', surface-grinding is performed to make the thickness of the alloy steel plate 8 to be, for instance, in a range of 1 mm to 5 mm. Needless to say, the surface grinding is carried out such that the surface of the above flame-sprayed layer 7 is parallel to that of the alloy steel 8.

(e') Then, as shown in FIG. 5e', the hard metal plate 5, worked to have a given thickness (for instance, about 5 mm) and the same size as that of the alloy steel plate 8, is diffusion-welded to the alloy steel plate 8 in the same manner as in the above step (d).

(f') Thereafter, as shown in FIG. 5f', the plurality of alloy steel plates 8 each having the above hard metal plate 5 joined thereto are joined to the die base body 6' (for instance, made of the alloy steel such as tool steel) worked in a specified shape, by brazing such that the side faces of the alloy steel plates 8 to which the hard metal plates are joined are adhered to one another (the joining portion is shown as the second joining portion 9). It is preferable that the joining temperature is set at a temperature far lower than the above-mentioned diffusion welding temperature so that no strain is cause upon the first joining portion 7 by thermal stress. Therefore, the joining in the step (f) may be performed by soldering or brazing. The above joining may be performed by a mechanical means such as screw fixing (not shown) or the like.

(g') Then, as shown in FIG. 5g', a plurality of the openings 4 are bored from the rear face 2 of the above die base body 6' toward the alloy steel plate 8 by means of a drilling machine or the like. The boring locations of the openings 4 are selected such that the centers of the openings may be in coincidence with those of the forming slits mentioned later.

(h') As shown in FIG. 5h', the forming slits 3, which communicate with the above openings 4, are bored from the surface of the above hard metal plate 5, that is, the die front face 1 toward the alloy steel plate 8, by electrical discharge machining or metal machining. The locations of some of the above forming slits 3 are selected to be in coincidence with the place where the hard metal plate 5 and the alloy steel plate 8 are joined with the adjacent ones. The depth of the forming slits is preferably deeper than that of the joining portion 7 so that the extruding force applied to the first joining section 7 may be decreased thereby.

The die according to the embodiment of the present invention, as shown in FIG. 3, for shaping the honeycomb structural body can be produced according to the steps (a')–(h').

In the above, the honeycomb structural body and the method of producing the same have been described in detail, but the invention is not limited thereto. The invention may be:

(1) The hard metal plate 5, in which the forming slits 3 are formed, may be made of other wear resistant alloy. In such a case, it is preferably that the first joining portion 7 may be a flame-sprayed layer made of an alloy powder having substantially the same properties as those of the wear resistant alloy used.

(2) Although the openings 4 are bored before the forming slits 3 are worked, the openings may be bored after the forming slits are formed.

(3) Although explanation has been made on the case where the sectional profile of the forming slits 3 is square, they may be triangular, hexagonal, octagonal or rectangular depending upon the intended honeycomb profile.

(4) The extrusion material in the forming die according to the present invention is not limited to the ceramic material, and as a matter of course, the invention may be applied to a rubber material.

As mentioned above, the present invention can provide the honeycomb forming die and the producing method thereof by which the following effects can be produced. That is, (i) As compared with the dies of the conventional structure, the wear amount of the forming slits is lower and the durable life of the die can be more prolonged than that of the conventional dies (for instance, by about 10 times as long as that of the conventional dies). In the case that a hard raw material of alumina or SiC material and mullite material with a coarse particle size is extruded, the variation of the slit width is smaller than the conventional dies, and therefore, the durable life during which the die can be used for production purpose is increased.

(ii) Since variation in the slit width of the honeycomb structural body extruded is smaller, the forming die is permits excellent dimensional precision for extruding the honeycomb structural body for a long period of time.

(iii) Since the dimensional precision is good, as mentioned above, no variations in the material density at various portions of the core of the honeycomb structural body thus extruded occurs. For instance, in the case of the ceramic honeycomb, cracking of the shaped article can be prevented during the firing process.

What is claimed is:

1. A method of manufacturing a honeycomb structural body-extruding die provided with forming slits having a sectional profile conforming to that of honeycomb structural body to be shaped and a given depth from the front face of the die toward the rear face thereof and a plurality of openings formed from the rear face of the die toward the front face thereof to communicate with the forming slits, which method comprises steps of working a plate made of a wear resistant alloy and constituting the die front face and a die base body made of an alloy steel and constituting the die rear face into given profiles; flame-spraying a wear resistant alloy onto one of the worked faces of the die base body to form a flame-sprayed layer of the wear resistant alloy, joining the wear resistant alloy plate to the die base body through the flame-sprayed layer of the wear resistant alloy; working the forming slits in the wear resistant alloy plate; and boring the openings in the die base body.

2. A method of manufacturing a honeycomb structural body-extruding die provided with forming slits having a sectional profile conforming to that of honeycomb structural body to be shaped and a given depth from the front face of the die toward the rear face thereof and a plurality of openings formed from the rear face of the die toward the front face thereof to communicate with the forming slits, which method comprises steps of working a plate made of a wear resistant alloy plate constituting the front face of the die, a die base body made of an alloy steel and constituting the rear face of the die, and an alloy steel plate to be interposed between the wear resistant alloy plate and the die base body into given profiles; flame-spraying on a face of the alloy steel plate a metal having substantially the same properties as those of the wear resistant alloy plate to form a flame-sprayed layer of the wear resistant alloy; grinding the plane of the wear resistant alloy flame sprayed layer up to a given thickness and joining the wear resistant alloy plate to the wear resistant alloy flame-sprayed layer on the alloy steel plate; joining the other face of the alloy steel plate opposite to the one face, which the wear resistant alloy plate is joined, to the die base body; working the forming slits from the wear resistant alloy plate toward the alloy steel plate; and boring the openings from the die base body toward the alloy plate.

* * * * *